United States Patent

Southard

[11] 4,190,742
[45] Feb. 26, 1980

[54] PROCESS AND APPARATUS FOR PRODUCING CONFERENCE CONNECTIONS IN A PCM TIME MULTIPLEX SWITCHING SYSTEM

[75] Inventor: Gary D. Southard, Marlton, N.J.

[73] Assignee: Siemens Aktiengesellschaft, Berlin & Munich, Fed. Rep. of Germany

[21] Appl. No.: 912,440

[22] Filed: Jun. 5, 1978

[51] Int. Cl.² ............................................. H04M 3/56
[52] U.S. Cl. ........................... 179/18 BC; 179/15 AT
[58] Field of Search ........... 179/1 CN, 15 AT, 18 BC

[56] References Cited

U.S. PATENT DOCUMENTS

| 3,551,600 | 12/1970 | Berch | 179/18 BC |
| 4,119,807 | 10/1978 | Nahay | 179/18 BC |

*Primary Examiner*—Robert S. Tupper
*Assistant Examiner*—Joseph A. Popek

*Attorney, Agent, or Firm*—Hill, Van Santen, Steadman, Chiara & Simpson

[57] ABSTRACT

In a PCM time multiplex switching system total code words are formed from individual PCM words supplied by the conference parties. In the process, intermediately constructed sum code words are stored, up-dated and restored upon the arrival of a new individual PCM word. Each arriving PCM word is also delayed by one pulse frame and subtracted from an intermediate code word to form the total code word which is transmitted to that party from which the delayed code word originates. The intermediate code words are stored in a connection memory which has two sections which receive alternate individual code words and which alternately connect the intermediate code words to an input adder and to an output subtracter for up-dating at the input and code word removal at the output.

5 Claims, 1 Drawing Figure

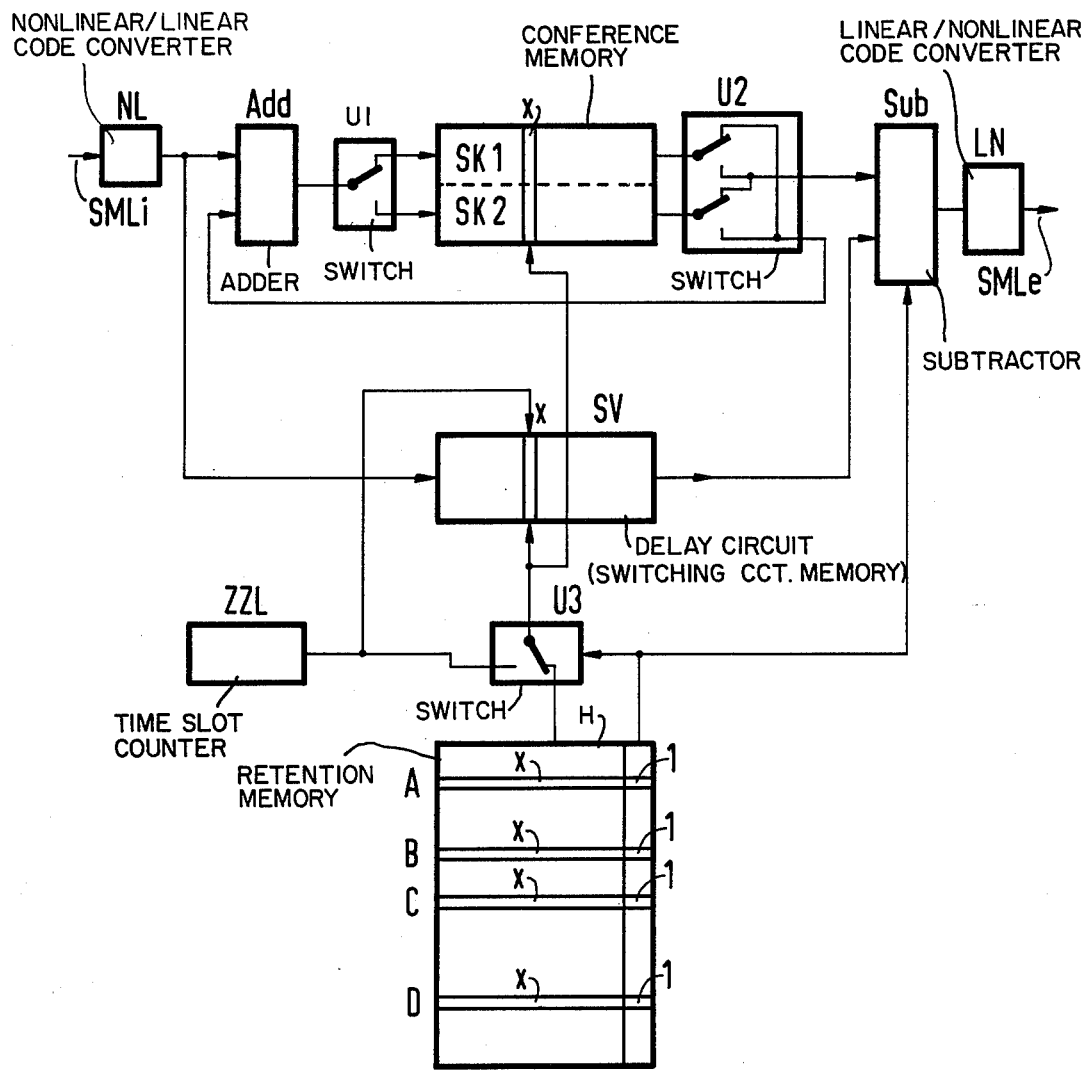

PROCESS AND APPARATUS FOR PRODUCING CONFERENCE CONNECTIONS IN A PCM TIME MULTIPLEX SWITCHING SYSTEM

BACKGROUND OF THE INVENTION

1. Field of the Invention

This invention relates to a process for producing conference connections in a PCM time multiplex switching system, and apparatus for carrying out the process, according to which the total sum code words are formed from the PCM words supplied by the conference parties, with the formation of intermediate sum code words which are stored in a conference memory, and, in each case, with the occurrence of a new PCM word supplied by a conference party, are read and added to this PCM word and then stored again as a new intermediate sum code word. Correspondingly delayed PCM words supplied in a prior pulse frame are subtracted from the new intermediate sum code word during the time slots assigned to the conference parties, and the final sum code words are respectively sent to the conference party whose sum portion is not contained in such word.

2. Description of the Prior Art

It is generally known to carry out a process of the type set forth above. For example, in U.S. Pat. No. 3,551,600 an adder and a first conference memory are provided for forming the intermediate sum code words or, respectively, the total sum code words. In this arrangement, the PCM words supplied by the individual conference parties are fed to one input of the adder and the intermediate sum code words which are read from the conference memory simultaneously with the occurrence of the PCM words and which are formed from previous PCM words are fed to the other input of the adder so that with each addition new intermediate sums are formed which contain the conference portion identifying a further conference party. These intermediate sum code words are then stored into the conference memory until the formation of a further intermediate sum or, respectively, finally, of the total sum code word. After the conclusion of a summing cycle of this kind, the total sum code word is transferred to a second memory which forms a component of a conference circuit of this kind, from which it is repeatedly read, in each case, during the time slots assigned to the individual conference parties, and is also fed to one input of a subtractor. The other input of the subtractor receives the PCM words of the individual conference parties, delayed by one pulse frame with the aid of a delay circuit. In this manner, during the time slots assigned to the conference parties, partial sum code words are formed, which do not contain the conference portion of another conference party.

The summing of the PCM words of the parties into a total sum code word, as well as the transfer of the word into the second memory of the conference circuit must occur within the time period of one pulse frame. Particularly in those cases in which a conference involves conference parties whose time slots are spaced nearly one pulse frame apart from one another, i.e. to whom, for example, the first and the last channel of a pulse frame are assigned, it is not readily guaranteed that PCM words or, respectively, intermediate sum code words and total sum code words simultaneously required for processing are also simultaneously available, and that writing and reading operations do not overlap on one and the same memory cell.

SUMMARY OF THE INVENTION

It is therefore the object of the present invention to provide a process, and apparatus for carrying out the process, of the type generally mentioned above in which the aforementioned difficulties are largely avoided.

This object is achieved in that the storing of the intermediate sum code words in the course of the formation of the total sum code words, and the storage of the total sum code words in the course of the formation of the final sum code words occurs in respectively a different half of a conference memory which is optionally triggered not only during writing but also during reading from pulse frame to pulse frame.

Because of the alternative use of the two conference memory halves during a respective pulse frame for the summing of the individual PCM words into a total sum code word, and during the respective other pulse frame for the formation and the transmission of the final sum code words, it is unnecessary to transfer the total sum code words from a first memory into a second memory, as is the case with the circuit arrangement for carrying out the aforementioned known process.

According to a particular refinement of the invention, the production of conference connections can be effected with the joint use of the switching memory of the associated retention memory of a PCM time multiplex switching system.

According to further refinements of the invention, advantageous circuit arrangements for carrying out the process are provided, i.e. not only for the case in which a circuit arrangement of this kind forms a separate complex, but also for the case in which it is incorporated into a time multiplex switching system.

BRIEF DESCRIPTION OF THE DRAWING

Other objects, features and advantages of the invention, its organization, construction and operation will be best understood from the following detailed description, taken in conjunction with the accompanying drawing on which there is a single FIGURE which is a schematic representation of a time multiplex switching system embodying the invention.

DESCRIPTION OF THE PREFERRED EMBODIMENTS

Referring to the drawing, a circuit arrangement for carrying out the process is set forth in schematic form. In the circuit arrangement, it has been assumed, as an example, that 16 PCM time multiplex lines are connected in the incoming transmission direction and 16 PCM time multiplex lines are connected for the outgoing transmission direction, with a time interlacing of the time channels formed on the individual time multiplex lines provided on the input side, along with a series-parallel conversion of the incoming information. On the drawing, however, only one super multiplex line SMLi is represented at the input side, on which, accordingly, 512 time slots are formed and which has 8 line leads for the 8 bits of the PCM words. At the output side, a corresponding super multiplex line SMLe is represented, which is connected to a parallel-series converter (not shown) and to a demultiplexer by means of which a parallel-series conversion and a distribution onto the 16 outgoing PCM time multiplex lines is performed.

Since, for achieving a constant useful signal-to-noise ratio over the entire amplitude range of the telecommunications information, the PCM words transmitted on the super multiplex lines are subjected to a non-linear coding, and PCM words coded in this manner are not readily able to be added, or, respectively, subtracted, a code converter NL is provided at the input side for converting from non-linear code representations into linear code representations, and a code converter LN is provided at the output side for converting from linear code representations into non-linear code representations.

The heart of the circuit arrangement represented on the drawing which serves for producing conference connections is a conference memory having two equal-sized sections SK1 and SK2, each of which has a number of memory cells equal to the number of conference connections to be expected simultaneously, at most. At the input side, these two memory sections are alternatively connectable, by way of a switch U1, to the output of an adder Add.

At the output side, the memory cells of the two memory sections SK1 and SK2 are alternatively connectable, by way of a switch U2, to the first input of a subtractor Sub or to the second input of the aforementioned adder Add. For the sake of clarity, the above-mentioned switches are represented as mechanical switches, but in practice are realized as electronic switches. The output of the code converter NL is connected to the input of a delay circuit SV, whose output is connected to a second input of the subtractor Sub. In the present case, the delay circuit is constituted by the switching system's switching memory, of which the described conference circuit is a component, and serves primarily for the production of dual connections by means of corresponding time slot conversion. Since two memory cells are required, in each case, in connection with the production of dual connections of this kind, the switching memory SV has 512 memory cells for a total of 256 simultaneously possible dual connections, and the memory cells, are, in each case, assigned to one of the time slots on the super multiplex lines. These memory cells are cyclically triggered during writing, which is indicated with the connection of the output of a time slot counter ZZL to the input of such memory cell, but are freely selectively triggered during reading. The triggering addresses for the free selection reading are supplied by a retention memory which also contains 512 time slot assigned memory cells for triggering addresses.

To the extent that the described switching memory SV only has the task of providing a time delay by one pulse frame in the course of the production of conference connections, its memory cells are cyclically triggered not only during writing, but also during reading. The switching of the two-mentioned types of operation is indicated by a switch U3 which, in the case of a conference connection for reading, supplies the address generated by the aforementioned time slot counter ZZL to the switching memory SV, instead of supplying a triggering address emitted by the retention memory. The switching signals for the switch U3 are stored in the additional memory locations of the memory cells of the retention memory H. In the case of the presence of a conference connection, these signals additionally are applied to the subtractor Sub. In the case of a normal dual connection, it is switched only as a through feed for the information read from the switching memory SV.

In the following, the operation of the circuit arrangement represented on the drawing will be explained in detail in conjunction with the production of conference connections. It is assumed that the switches U1–U3 take the indicated switching positions.

For the transaction of the contemplated conference connection, in which, for example, four conference parties A, B, C and D are to be involved, an optional pair of coordinated, free memory cells x in the conference memory sections SK1 and SK2 is selected, which pair is freely and selectively triggered, in each case, during writing and reading during the time slots assigned to the four conference parties, by means of corresponding entries in the retention memory H. With the appearance on the super multiplex line SMLi or, respectively, at the first input of the adder Add, of a PCM word supplied by a conference party, the memory content of the memory cell x of the first memory section SK1 is read and fed back to the second input of the adder Add. The intermediate sum code word formed by the adder is again written into the memory cell x of the memory section SK1. The prerequisites for the necessary slight time shifts between the writing operation and the reading operation are in effect because of the parallel representation of the PCM words. The explained operation repeats itself until a total sum code word is formed, which is composed of the PCM words of all conference parties.

At the beginning of the next pulse frame, the switches U1 and U2 are brought into the opposite switching position, so that, on the one hand, the output of the memory cell x of the first conference memory section Sk1 is connected to the first input of the subtractor Sub and, on the other hand, the above-described operations are now repeated in conjunction with the second conference memory section SK2.

During the time slots assigned to the conference parties in the pulse frame under consideration, the total sum code word located in the memory cell x of the memory section SK1 is read several times, non-destructively, and, as mentioned, is fed to the subtractor Sub. In each, simultaneously, there appears at the second input of the device a PCM word supplied by a conference party and which occurred in the previous pulse frame, which word has been delayed by the memory SV by the length of a pulse frame. The memory cells of the switching memory SV which have been assigned to the time positions of the conference parties are, as mentioned, cyclically triggered for this purpose, not only during writing, but also during reading. During the time slots assigned to the conference parties, the subtractor Sub thus supplies partial end sum code words, in each case, which do not contain the conference portion of information of the conference party to which the time slot involved is assigned.

These partial end sum code words which have linear code representation, are converted into non-linear code representations by the code converter LN, and are then fed to the conference party concerned by way of the outgoing super multiplex line SMLe and the device and time multiplex lines connected thereto, which are not illustrated on the drawing.

In the following pulse frame, the conference memory sections SK1 and SK2 again exchange roles. Before one of these memory sections is called upon for summing up the PCM words of the individual conference parties, the content of the memory cell x engaged for the conference concerned is erased, so that the value "0" is added to the PCM word which occurs first in this pulse frame, in this case the PCM word of the conference party A. The signals for an erasing operation of this type is derived from a recognition occurring at the beginning of every second pulse frame.

If normal dual connections are to be produced with the circuit arrangement represented on the drawing, signals are stored in additional storage locations of those memory cells of the retention memory H which are assigned to the time slots of these dual connections, and such signals then are applied, for example, to the memory cells of the switching memory SV being free-selectively triggered during reading, so that the switch U3 then assumes the opposite switching position; and, on the other hand, the subtractor Sub is influenced in such a way that it only receives the PCM words arriving at its second input from the switching memory SV, and merely through-connects these words to the super multiplex lines SMLe.

Although the invention has been described by reference to particular illustrative embodiments thereof, many changes and modifications of the invention may become apparent to those skilled in the art without departing from the spirit and scope of the invention. It is therefore intended that the patent warranted hereon include all such changes and modifications as may be reasonably and properly included within the scope of this contribution to the art.

I claim:

1. A process for establishing conference connections in a pulse code modulation time multiplex switching system in which total code words are constructed from code words supplied by conference parties and then transmitted to the conference parties, comprising the steps of:
   receiving code words from the conference parties during their respective time slots;
   delaying each received code word by one pulse frame;
   adding each received code word to a previous code word and storing the result as an intermediate code word and repeating adding and storing as each code word is received;
   subtracting the delayed code word each frame from the stored result of addition to form the total code words; and
   transmitting each total sum code word during the respective time slot to the conference party whose delayed code word was subtracted to obtain the respective total code word.

2. The process of claim 1, wherein the step of delaying each received code word is further defined as:
   storing the received code word in a memory at the respective time slot of a pulse frame; and
   reading the stored code word in the same time slot of the subsequent pulse frame.

3. A circuit arrangement for establishing conference connections in a pulse code modulation time multiplex switching system which receives individual code words from the conference parties during their respective time slots and transmits total code words to the conference parties during their respective time slots, comprising:
   an incoming time multiplex transmission line;
   an adder connected to said incoming line;
   a conference memory including first and second memory sections each having a number of memory cells corresponding, at most, to the maximum number of possible conference connections;
   first switch means operable to alternately connect said memory sections to said adder whereby the memory sections alternately store the results of addition as intermediate code words;
   an outgoing time multiplex line;
   a subtractor connected to said outgoing time multiplex line for feeding the total words thereto;
   a delay circuit connected between said incoming time multiplex line and said subtractor for delaying each received individual code word by one pulse frame; and
   second switch means operable to alternately connect said first and second memory sections to said adder and to said subtractor with one of said memory sections connected to said adder while the other is connected to said subtractor so that the intermediate code words are updated while total code words are formed and transmitted.

4. The circuit arrangement of claim 3, wherein:
   said delay circuit comprises a connection memory, and further comprising
   a retention memory connected to said connection memory and comprising memory cells assigned to the time slots of the time multiplex lines and operable to address and cause reading of said connection memory to the subtractor.

5. The circuit arrangement of claim 4, wherein said retention memory comprises additional memory locations storing information as to whether a call is a dual connection or a party connection call and operable in response to dual connection calls to prevent subtraction by said subtractor.

* * * * *